(No Model.)
T. A. EDISON.
SECONDARY BATTERY.
No. 274,292.  Patented Mar. 20, 1883.
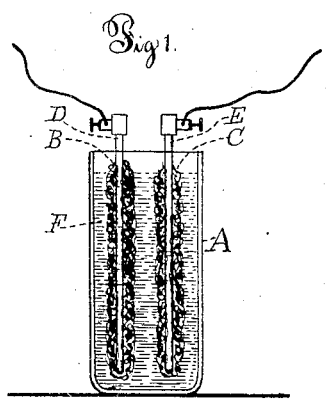
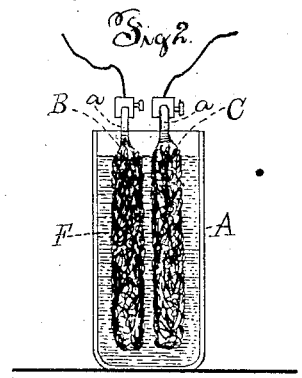
WITNESSES:
E. G. Rowland
W. W. Seely
INVENTOR:
T. A. Edison by
Rich'd N. Dyer
Atty

UNITED STATES PATENT OFFICE.

THOMAS A. EDISON, OF MENLO PARK, NEW JERSEY.

SECONDARY BATTERY.

SPECIFICATION forming part of Letters Patent No. 274,292, dated March 20, 1883.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Secondary Batteries, (Case No. 439;) and I do hereby declare that the following is a full and exact description of the same, reference being had to the accompanying drawings, and to the letters of reference marked thereon.

Heretofore in secondary batteries the electrodes have been formed of lead plates, or lead plates having oxide of lead secured thereto, or of lead plates carrying chemically-precipitated metallic lead; but all these constructions have defects which detract greatly from their efficiency. The simple lead plates present a very small surface, and hence have a low efficiency, and, in addition, it becomes necessary, for that reason, to reduce the surface of the plates to oxide to a considerable depth. This thick coat of oxide cracks off and separates at points from the plates, producing bad contact and high resistance, and making portions of the oxide inert and reducing greatly the efficiency of the battery. With the second construction—that of the oxide secured to lead plates—the oxide also becomes separated from the lead plates, resulting in bad contact, high resistance, inert portions, and loss of energy. The spongy or chemically-precipitated lead carried by lead plates is also open to the same objection, the precipitated lead not being integral with the plates which carry it or the particles of the lead with one another, and becoming detached from such plates in use.

The object, therefore, that I have in view is to produce electrodes of metallic lead for secondary batteries without the use of chemically-precipitated lead or salts or compounds of lead, which electrodes will be integral throughout and will present an exceedingly large surface, producing a highly efficient battery by a small reduction of the surface of the lead, and not having the defects before stated. This I accomplish by constructing each electrode, or the exposed surface thereof, of integral arborescent metallic lead. This form of lead is obtained by pouring molten lead from a height into water or into powdered material—such as powdered chalk or lime—or by blowing air through molten lead. The crystallization of the lead being disturbed at the moment of setting, the lead assumes an arborescent form, presenting a large surface and being integral throughout its mass. This integral arborescent lead may be fused to lead plates by fusing the surfaces of the plates and pressing the arborescent lead upon them. The arborescent lead is thus made integral with the plates which carry it, the plates forming means for making connection; or molten lead may be blown onto lead plates in dropping from a height, and will be fused with the plates and assume upon them the arborescent form. The electrodes are, however, preferably made entirely of arborescent metallic lead, and they may be so constructed by pouring molten lead into suitably-shaped troughs or receptacles containing water. The arborescent lead will take the shape of the troughs, and lugs for making connections may be formed by pinching or fusing the arborescent lead together. This form of electrodes has openings entirely through it, and has the advantage, in a battery, of bringing the back sides of the outer electrodes into action, increasing the efficiency of the battery.

In the drawings, Figure 1 is a vertical section of a secondary cell having the electrodes made partly of integral arborescent metallic lead; Fig. 2, a similar view of a secondary cell having the electrodes made entirely of such lead.

A is the containing-vessel. B C are the electrodes, made entirely of integral arborescent metallic lead, formed as before explained, with lugs a for connections, Fig. 2; or these electrodes may be lead plates D E, having exposed surfaces of integral arborescent metallic lead fused to said plates, Fig. 1. F represents the dilute sulphuric acid of the cell.

What I claim is—

1. An electrode for secondary batteries, formed partly or entirely of arborescent metallic lead and made integral throughout its mass, substantially as set forth.

2. An electrode for secondary batteries, composed of arborescent metallic lead and made integral throughout its mass, substantially as set forth.

This specification signed and witnessed this 3d day of June, 1882.

THOS. A. EDISON.

Witnesses:
RICHD. N. DYER,
EDWARD C. ROWLAND.